United States Patent [19]

Celsi

[11] Patent Number: 4,979,345
[45] Date of Patent: Dec. 25, 1990

[54] TRANSLUCENT SELF-SUPPORTING ENCLOSURE FOR BUILDING STRUCTURES

[75] Inventor: Giovanni Celsi, Novara, Italy
[73] Assignee: Polyu Italiana S.r.l., Italy
[21] Appl. No.: 324,031
[22] Filed: Mar. 16, 1989

[30] Foreign Application Priority Data

Apr. 28, 1988 [IT] Italy ............................. 20356 A/88

[51] Int. Cl.[5] .......................... A01G 9/00; E04B 2/30
[52] U.S. Cl. ........................................ 52/481; 52/584; 52/762; 47/17
[58] Field of Search ............... 52/762, 202, 799, 481, 52/584; 47/17

[56] References Cited

U.S. PATENT DOCUMENTS

| | | | |
|---|---|---|---|
| 613,599 | 11/1898 | Pease | 52/762 |
| 2,102,247 | 12/1937 | Whelan | 52/762 |
| 2,627,949 | 2/1953 | Willson | 52/762 |
| 2,986,150 | 5/1961 | Torain | 47/17 |
| 3,341,395 | 9/1967 | Weber | 52/799 |
| 3,583,115 | 6/1971 | Colmenares | 52/222 |
| 3,667,182 | 6/1972 | Stemier | 52/762 |

FOREIGN PATENT DOCUMENTS

182164 11/1980 Italy .

Primary Examiner—John E. Murtagh
Attorney, Agent, or Firm—Kirschstein, Ottinger, Israel & Schiffmiller

[57] ABSTRACT

An improved translucent self-supporting enclosure for building structures, consisting of a plurality of strip panels (2; 11) having a wall portion (3) and end flanges (4; 13) converging towards the inside of the panels (2, 11), as well as a split assembly profile (5; 14) engaging with elastic preloading the opposing and flanges (4; 13) of two adjacent strip panels (2; 11), in which, in the assembly profiles (5) for enclosures with a flat enclosure, there are provided grooved seats (8) for accommodating respectively an engaging tongue (10) provided in the ends of additional strip panels (2a) for forming a double-wall self-supporting enclosure, while for the construction of self-supporting enclosures with a curved surface the strip panels (11) are pre-constructed so as to be curved, and tubular profiles (14), also pre-curved, are provided as split assembly profiles (14). Covering profiles (15) made of plastic and designed to accommodate sliding window panels (23) can be associated with said pre-curved assembly profiles (14). So that the strip panels (2; 2a; 11) have a high insulation factor, a reticulation (2b) with slanting walls (2d) inclined in opposite directions is formed between the opposing walls (2c) of the same strip panels.

Curved self-supporting enclosures are used in particular in the construction of vaulted roofing for warehouses, garages, greenhouses and the like.

6 Claims, 2 Drawing Sheets

TRANSLUCENT SELF-SUPPORTING ENCLOSURE FOR BUILDING STRUCTURES

1. Field of the Invention

The present invention relates to a translucent self-supporting enclosure for building structures.

2. Description of Related Art

Italian Pat. No. 182,164 discloses a self-supporting assembly for enclosing building structures and more precisely for realizing vertical and horizontal enclosures in civil and industrial buildings so as to achieve protection against external agents. These enclosures should therefore have, if possible, a high insulation factor. According tot he patent mentioned, the said self-supporting assemblies are formed from a plurality of polycarbonate strip panels consisting of two opposing walls connected by ribs perpendicular to the same and mutually parallel and having lateral flanges converging towards the inside of the respective strip panel, the flanges of two adjacent strip panels being clamped against each other by means of an assembly profile in the form of a metal box-shaped upright with a cross-section substantially in the form of a U, the lateral sides of which have a matching shape with respect to the external shape of the said converging flanges of the profiles and, in the assembled state, clamp the said flanges against each other with elastic preloading.

With the self-supporting assemblies disclosed in the abovementioned patent, it is therefore possible to construct only horizontal or vertical, or at any rate slanting, enclosure walls, which in any case have a flat surface. A further limitation of the known strip panels is that they have a relatively low insulation factor.

SUMMARY OF THE INVENTION

A main object of the present invention consists in creating a translucent self-supporting enclosure of the type mentioned, which is improved and capable of producing enclosures likewise with a curved surface, so as to allow the construction of vaulted roofing for warehouses, greenhouses, garages and the like.

Another object of the present invention consists in the possibility of constructing enclosure walls configured, as required, as single-wall or double-wall enclosures. Advantageously the additional wall serving to form the double-wall enclosure may be applied at any time, i.e. during installation of the self-supporting enclosure or subsequently, without having to use additional connecting components or carry out adaptation work.

Another object of the present invention consists in making provision, in the enclosures with a curved surface, for the construction cf apertures which can be opened and which serve as a window.

Yet another object of the present invention consists in structuring both the straight and the curved enclosure panels in such a way as to obtain, together with a structure which can be easily constructed and a limited use of material, a high insulation factor for the said strip panels, or the enclosure walls produced using the same.

Furthermore, the objects of the present invention include structuring the curved enclosure panels so as to ensure, after installation of the same, that they have a perfect external surface, i.e. a surface without bending or bulging towards the inside.

The abovementioned objects, forming the basis of the present invention, as well as others which will emerge below, are achieved in the form of improved selfsupporting enclosures of the type indicated, which are characterized in that they have the special features described in the claims.

Numerous advantages are obtained with the improved self-supporting enclosure according to the invention. Firstly, it is possible to construct selfsupporting enclosures with a curved wall, as well as those of a mixed type, i.e. partly with an arched surface, using strip panels and connecting profiles which can be easily constructed and assembled. Construction of the enclosure in the double-wall version, or subsequent completion of the same, so as to form a double-wall enclosure, is performed simply by applying additional strip panels, forming the additional wall, without the need for further components. Furthermore, the thickness of the additional panels for forming the double wall may be advantageously chosen as required. In the case of the curved panels, it is possible to provide advantageously for the formation of a window opening in any given zone of the said panel, it being possible for said openings to have any desired height. The profiles intended to accommodate the movable window panel may advantageously be constructed as extruded plastic parts, the same engaging directly with geometric engagement over the connecting profiles of the strip panels, thereby avoiding the known fixing means in the form of screws, hinges and the like. The improved insulation properties are advantageously achieved in that the internal ribs between the opposing walls of the panels are designed such that they can be formed in an extremely simple manner and require a totally insignificant amount of additional material compared to the known design with parallel ribs.

Further characteristic features, advantages and details of the improved translucent self-supporting enclosure according to the invention will also emerge more clearly from the following description, with reference to the accompanying drawings, showing in diagrammatic form a preferred embodiment of the improved translucent self-supporting enclosures according to the invention, of the flat type and curved type.

DETAILED DESCRIPTION OF THE PREFERRED EMBODIMENTS

In the abovementioned figures, in which the various dimensional ratios are not shown accurately to scale for greater clarity of illustration and in which the same parts are denoted by the same reference numbers, an improved translucent self-supporting enclosure according to the invention is indicated in its entirety by 1. The same refers to the design both of enclosures with a flat surface and of those with a curved surface, as well as those of the mixed type.

Figure 1:
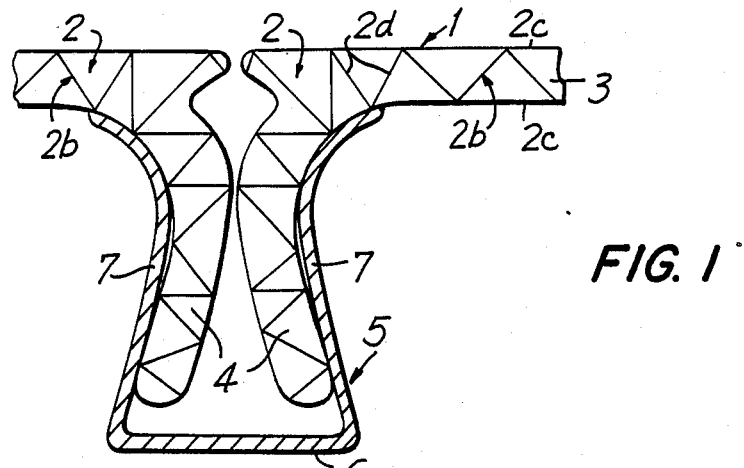
FIG. 1 shows a cross-section through two adjacent strip panels of a flat-surface enclosure wall with an assembly profile according to the invention.
Figure 2:
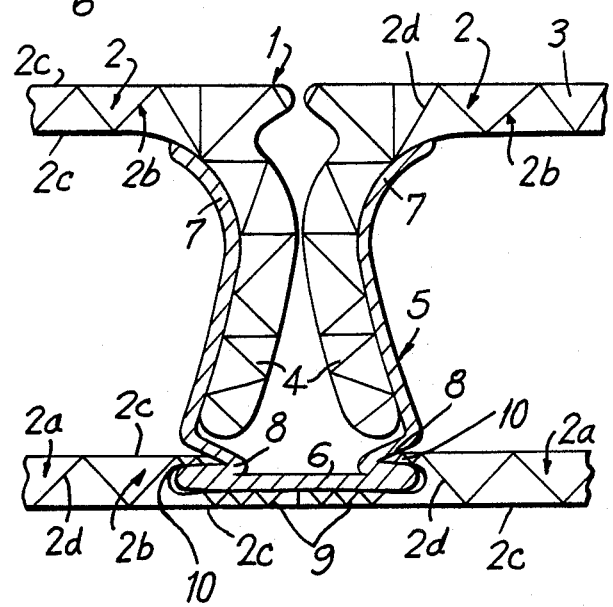
FIG. 2 shows a cross-section similar to that of FIG. 1, but with an enclosure wall constructed as a double wall.

Reference is made first to FIGS. 1 and 2 relating to flat-surface enclosures. Said self-supporting enclosures are formed by a plurality of strip panels 2 each having a proper wall portion 3 and end flanges 4 constructed so as to converge towards the inside of the said strip panel 2, the flanges 4 of two adjacent panels 2 being clamped together by means of an assembly upright or metal profile 5. The latter has a structure substantially in the shape of a U with a bottom side 6 and narrowly converging lateral sides 7, the shape of which is substantially matching with respect to the shape of the said end flanges 4 of the panels 2, so as to ensure clamping engagement for preloading with geometric or configurational engagement of the same end flanges. According to the invention, in the bottom part of the assembly profile 5, substantially in the region of the bottom side 6, there are provided two undercut longitudinal grooves 8. The same serve to anchor additional panels 2a, in order to construct self-supporting doublewall enclosures, as shown in FIG. 2. For this purpose, said additional panels 2a have a flat extension and lowered ends defining an abutment portion 9, as well as a fixing, or hooking, tongue 10 engaging inside an associated groove 8. The shape and dimensions of the longitudinal grooves 8, as well as those of the engaging tongues 10, may be freely chosen.

As can be seen in FIGS. 1 and 2, the panels 2, as well as the additional panels 2a, have, between their opposing walls 2c, an internal reticulation 2b with slanting walls 2d. As may be determined from experimental comparisons, an internal reticulation 2b structured in this manner enables a particularly high insulation factor to be obtained, while using in practice an extremely limited amount of material.

Figure 5A:
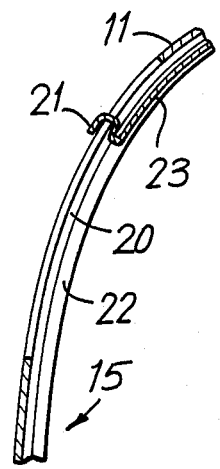
FIG. 5a is a detailed cross-section along the line Va—Va of FIG. 5.
Figure 5:
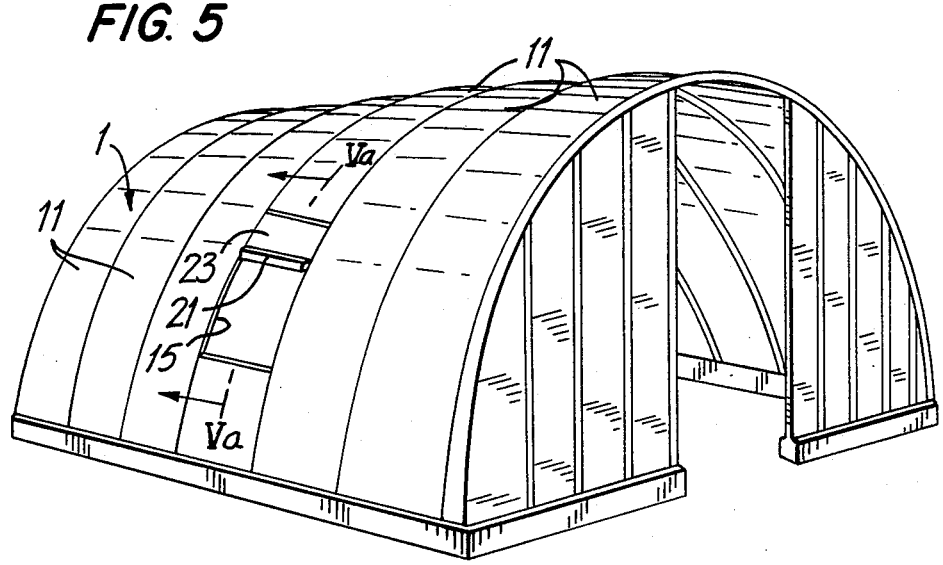
FIG. 5 is an example of application of a curved translucent wall according to the invention for the construction of a greenhouse.

Since the strip panels 2, while having a mainly flat extension, possess end flanges 4 in the form of ribs, such panels cannot simply be curved so as to form curved translucent walls, as for example required in the case of a greenhouse as shown in FIG. 5. The same metal assembly profiles 5 do not allow them to be curved.

Figure 3:
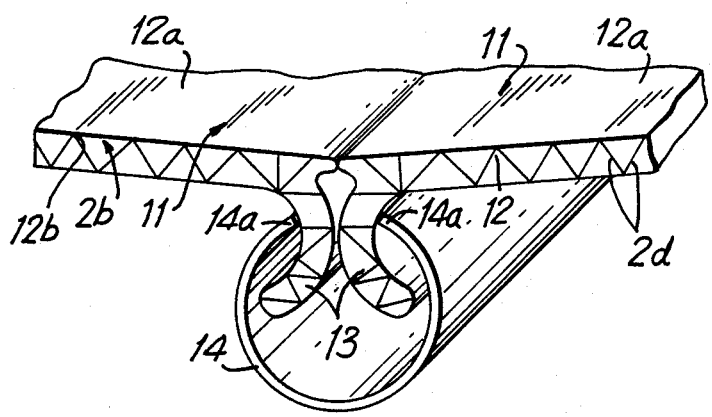
FIG. 3 shows a cross-section through two strip panels for curved walls and the associated assembly profile according to the invention.

According to the invention, such walls with a curved surface may now be obtained by using curved strip panels 11, which have a wall portion 12 with end flanges 13, as can be seen from FIG. 3. According to the invention, in order to assemble two adjacent curved strip panels 11, a metal assembly profile 14 with a split tubular cross-section is provided, the longitudinal edges of the split being indicated by 14a. In this way, the profile 14 may be curved with the particular radius of curvature, or curvilinear profile, required. Using strip panels 11 and curved assembly profiles 14, it is possible to construct, therefore, curved self-supporting walls with any desired curvilinear shape, intended for example for greenhouses, as shown in FIG. 5, or for vaulted roofing for warehouses, garages and the like.

Figure 4:
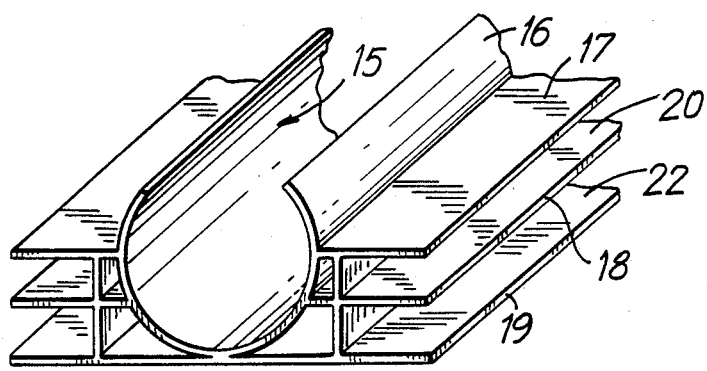
FIG. 4 is a perspective detail showing a covering profile for applying, windows in walls with a curved surface.

In the case of greenhouses for example, provision is also made for applying ventilation windows of the sliding type, in which the window panel has a curved shape similar to that of the panels 11. In order to apply such windows, covering profiles 15 made of resilient material are provided, these profiles having a split tubular body 16 with strip-like projections 17, 18, 19, on both sides of the body, 16, as shown in FIG. 4. Such a profile is advantageously made of plastic, the internal diameter of the tubular body 16 having a diameter substantially equal to the external diameter of the tubular assembly profile 14, or slightly smaller than the same, so as to have a more pronounced clamping action on the latter. The split tubular body 16 and the flangeshaped strips 17, 18 and 19 are formed as one piece. A substantially U-shaped profile 21, acting as a sill, is accommodated in the interspace 20 closest to the wall surface 12 of the curved panel 11, while the movable window panel 23 is accommodated inside the interspace 22.

An internal reticulation, as illustrated above, is also provided for the curved panels 11 according to the present invention.

As can be seen from FIG. 3, the external surface of the wall portion 12 of the panels 11 curved in the longitudinal direction is slightly convex in the transverse direction so as to prevent the external surface of the curved panels 11 bending or bulging inwards during installation thereof.

From the above structural and functional description of the improved self-supporting enclosures according to the invention, it can be seen that the same effectively achieve the objects mentioned and enable the advantages mentioned in the introductory part to be obtained.

With respect to flat enclosures, it is therefore possible to have walls which offer greater insulation and which may, as required, be constructed with a single wall or a double wall, it being possible for the double wall to be constructed during installation of the wall itself or subsequently.

With respect to the curved walls, the same may be realized with any radius or profile of curvature required, using the curved panels and associated assembly profiles proposed. Using the plastic tongued profiles, it is also possible to obtain advantageously ventilation windows with a sliding leaf, for greenhouses for example.

In practice all the individual parts may be replaced by others technically and/or operationally equivalent, without thereby departing from the protective scope of the present invention. Also, the geometric shape of the various parts which can be joined together may be chosen as required, depending on the particular case in question.

The dimensions and materials, as well as the use of any sealing devices, by their very nature may be freely chosen.

All the characteristic features evident from the description, the claims and the drawing are considered essential for the present invention, both separately and in any mutual combination.

I claim:

1. A self-supporting building structure, comprising:
   (a) a plurality of assembleable translucent outer strip panels extending along a longitudinal direction and forming an outer wall for the structure, each outer panel having opposite wall portions generally parallel to each other and a pair of longitudinally-extending flanges spaced apart of each other along a transverse direction which is generally perpendicular to the longitudinal direction, each outer panel having an internal network of inclined walls between the wall portions and forming generally triangularly-shaped insulating chambers;
   (b) connector means for assembling the outer strip panels in a side-by-side relationship along the transverse direction with the flanges of adjacent outer strip panels being in confronting relationship, said connector means including a longitudinally-extending, generally U-shaped connector having an open top and connector walls bounding an interior in which the confronting flanges of adjacent outer strip panels are received with a snap-type action through the open top, to form a self-supporting, insulated assembly, one of the connector walls being a base wall opposite the open top, said base wall being formed with transversely spaced-apart, undercut grooves; and (c) translucent inner strip panels, each inner panel having a tongue receivable in a respective undercut groove, and an abutment engaging the base wall, said abutments of adjacent inner panels engaging each other to form a continuous inner wall for the structure.

2. The structure as recited in claim 1, wherein the opposite wall portions of each outer panel are substantially planar, and wherein the flanges of a respective outer panel are curved inwardly toward each other.

3. The structure as recited in claim 5, wherein the opposite wall portions of each outer panel are curved along the longitudinal direction, and wherein the flanges of a respective outer panel are curved inwardly toward each other.

4. The structure as recited in claim 3, wherein the opposite wall portions of each outer panel are also curved along the transverse direction.

5. The structure as recited in claim 1, wherein each inclined wall of the internal network extends at an angle other than 90° relative to the wall portions.

6. The structure is recited in claim 1, wherein the outer and inner panels are spaced apart in a mutually parallel relationship and at a spacing from one another, and wherein the connector means are entirely accommodated between the outer and inner panels in said spacing.

* * * * *